Jan. 21, 1964  J. F. BLAHA  3,118,334
PRE-SCANNING SPEED DETERMINING OR STOPPING
MEANS FOR HEAVY MOVABLE MACHINE MEMBERS
Filed Dec. 14, 1960  5 Sheets-Sheet 3

INVENTOR
JOHN F. BLAHA
BY
Marechal, Biebel, French & Bugg
ATTORNEYS

United States Patent Office 3,118,334
Patented Jan. 21, 1964

3,118,334
PRE-SCANNING SPEED DETERMINING OR STOPPING MEANS FOR HEAVY MOVABLE MACHINE MEMBERS
John F. Blaha, % Harris-Intertype Corp., 55 Public Square, Cleveland 13, Ohio
Filed Dec. 14, 1960, Ser. No. 75,818
10 Claims. (Cl. 83—71)

This invention relates to the control of movable machine members which it is desired to locate precisely in an infinitely variable number of positions, and particularly to the control of such members having substantial inertia, as in the case of a back gage used to position a pile of material beneath the knife of a cutting machine.

To provide an efficient control for relatively heavy moving machine members it is necessary to consider several factors which affect the accuracy of the control. The relatively heavy member, such as the aforementioned cutter back gage, has substantial inertia when traversed at relatively high speed. Therefore, when the member is stopped it will tend to coast a substantial distance, and it will be appreciated that under various operating conditions, for example varying with the weight of a pile being moved by a back gage, this distance of coast will fluctuate to such an extent that the ultimate stopping point may vary over a range too great for acceptable control limits. One widely used solution for this situation involves slowing the back gage or other member during a final portion of its movement such that the back gage approaches its preselected position at relatively low speed, from which it may be stopped without substantial inertia effects. The present invention relates to such a control system including a dual speed drive for the back gage or similar heavy moving member, operating to traverse the back gage over relatively longer distances at a higher speed and to drive the back gage at a slower speed during a final portion of its movement toward a preselected position.

Accordingly, the primary object of this invention is to provide novel control systems for governing the positioning of relatively heavy movable members precisely at an infinitely variable number of positions within the range of movement of such member.

Another object of the invention is to provide such a control system which includes provision for pre-scanning of the position control apparatus to determine whether the drive for the member should start in relatively higher or lower speed when moving from one preselected position to the next.

Another object of the invention is to provide such control systems which include storage members capable of retaining a plurality of erasable pulse generating means thereon spaced to define successive desired positions of the movable members, and placeable at infinitely variable locations within the range of the system.

Another object of the invention is to provide a novel position controlling member wherein a single impulse sensing device may function to control both the high to low speed transition of the drive means and the low speed to stop control.

A further object of the invention is to provide, in connection with such control systems, novel apparatus for placing and erasing impulse generating marks on a storage member directly on the machinery to provide for placement of the impulse generating marks directly in relation to the desired positions of the movable member.

Other objects and advantages of the invention will be apparent from the following description, the accompanying drawings and the appended claims.

In the drawings:

FIG. 1 is a somewhat schematic view illustrating one form of the invention as applied to a cutting machine for cutting piles of paper sheets and the like;

Figure 1:
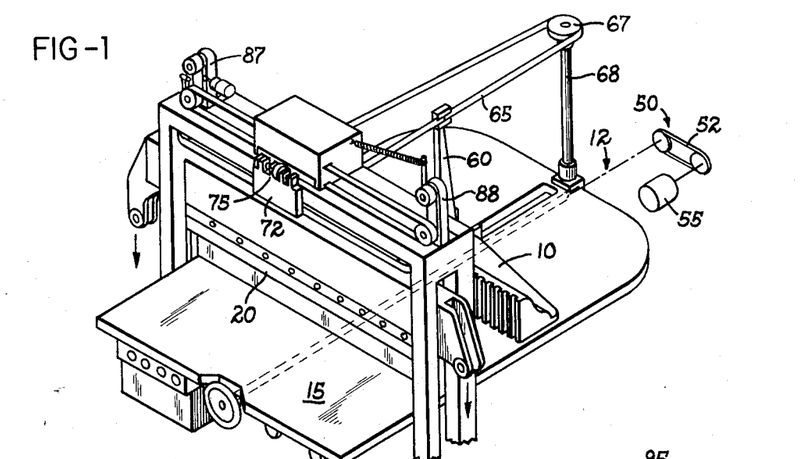
Figures 2, 4, 5:
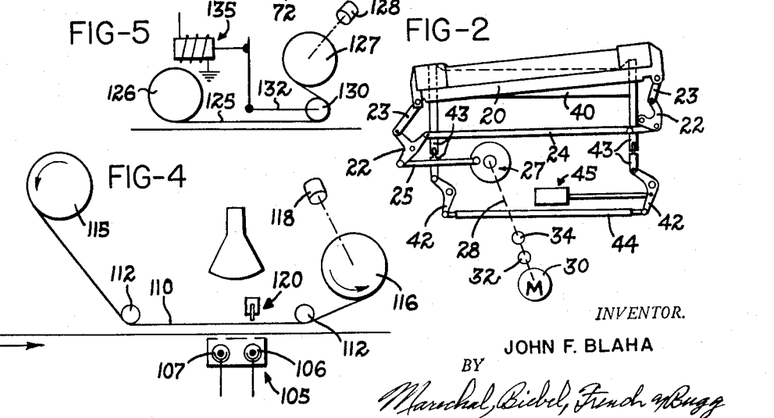
FIG. 2 is a schematic view of typical drives for the knife and clamp of the cutting machine.
FIG. 4 is an enlarged schematic illustration of the marking apparatus of the system.
FIG. 5 is an enlarged schematic view of the erasing mechanism.
Figure 3:
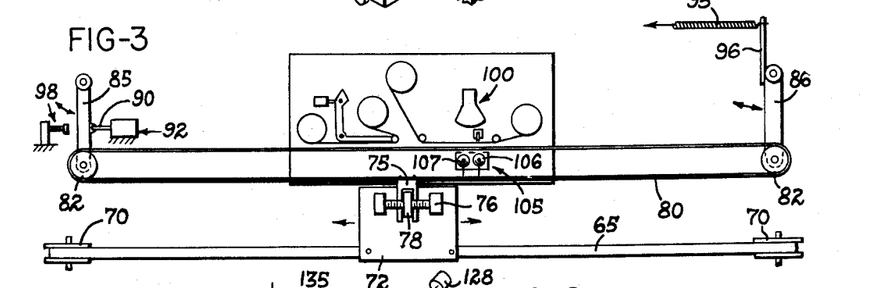
FIG. 3 is a schematic diagram of the control system as applied to the machine shown in FIG. 1.

Referring to the drawings, which show several preferred embodiments of the invention, and referring particularly to FIGS. 1–3, a novel control system incorporating the features of the present invention is shown as applied to a cutting machine, connected to control the movements of the back gage 10 which is driven by means of a lead screw indicated schematically at 12 to move over the surface of the work table 15 of the cutter. The back gage is normally withdrawn toward the rear of the table at the beginning of an operation and moved forward in a series of movements, preferably infinitely variable in length, to position a pile of material (not shown) such as sheets of paper or the like in the cutting plane of the knife 20 which is driven to reciprocate in a vertical plane toward and away from table 15 to cut through the pile of material at desired positions in accordance with placement of the pile on the table by the operator, and accordingly to the movement of back gage 10.

The knife customarily includes a power drive of known construction, including (FIG. 2) bell cranks 22 pivotally mounted in the cutter frame at opposite sides of work table 15, each connected to an opposite end of knife 20 by a link 23, and connected for conjoint movement by a cross link 24. This linkage is operated through a connecting rod 25 which is pivotally secured at one end to one of the bell cranks, and at its other end to a rotatable drive member or crank shown schematically at 27. The crank is driven through a single revolution for each cutting cycle by means of a drive shaft 28 which is rotated by motor 30 through a connecting clutch 32, and when the clutch is in its open or disconnecting state, a brake 34 preferably is applied to the drive shaft 28 to hold the knife in its raised position as shown. Details of such structure are shown in the patent to Spiller et al. 2,649,155 issued August 18, 1953.

It is also desirable to clamp the pile in a stationary position during the cutting stroke of the knife, and for this purpose a clamp 40 is mounted for vertical movement immediately behind knife 20 and is power operated by a pair of bell cranks 42 which are pivotally mounted on the machine, connected to opposite sides of the clamp by links 43 and connected to each other by a cross link 44. One of the bell cranks 42 is power driven by a suitable motor 45 which may be, for example, a hydraulic cylinder, as well known in the art. The back gage 10 is driven by rotating the lead screw 12 through a two speed transmission unit indicated schematically at 50, and driven for example through belt drive 52 by a reversible electric motor 55. The transmission 50 may be of any suitable construction, and generally embodies a speed reduction of approximately 50:1 between its high speed ratio (usually 1:1) and its low speed ratio. The transmission ratio is preferably selected by energizing selectively one or the other of a pair of controlling magnetic coils (FIG. 8) with the coil 57 providing the higher or fast speed when energized, for normal traversing movements of the back gage when moving a pile forward toward a cutting position, and when moving the back gage in reverse at the end of a cutting operation, and a slow speed coil 58 which when energized causes transmission 50 to provide the necessary speed reduction to advance the back gage, and the pile being moved thereby, toward a desired position at a relatively slow speed during the final portion of its positioning movement. Thus, by slowing the back gage, as is well known in the art, the effects of inertia on the pile itself and on the relatively heavy back gage may be substantially avoided, and the pile brought to a halt precisely in the desired preselected positions.

The present invention relates particularly to novel controls for governing the positioning of the back gage in such precise preselected positions, including record members which may be marked, either physically or electrically, with impulse generating means as the back gage is operated manually through a set up cycle to select the desired positions thereof in accordance with the cuts to be made in a pile of sheet material or the like supported on work table 15. The marks are in the form of erasable impulse generating means which may be infinitely variably spaced along the record number, and which may be either in the form of physical erasable marks adapted to interrupt a light beam to generate a controlling impulse, or in the form of magnetized portions on the control member which will generate the controlling impulse when moved relative to a magnetic pickup head.

Referring to FIGS. 1 and 3, the back gage 10 includes an upwardly extending arm 60 which is fastened to a control tape 65, preferably metallic, and the tape in turn is reeved about a rear guide pulley 67 mounted on a shaft 68 which extends vertically above the rear end of table 15. The tape passes forwardly of the table above the back gage and the clamp 40 around a pair of guide pulleys (not shown) which are generally above the clamp, and thence outwardly toward opposite ends of the knife supporting super-structure around a pair of end guide pulleys 70 (FIG. 3).

At the front of the machine the tape 65 carries a main motion transmitting block 72 which moves in relation to movement of the tape, and therefore in relation to the movement of back gage 10. This block carries an auxiliary block or motion transmitting member 75 having an adjustable connection with the main block 72, a fine adjustment screw 76 which is threaded therethrough and engages a lug 78 on the main block 72. The screw 76 includes knobs at its opposite ends, each of which may be rotated by the operator to provide for relative movement between the lug 78 and auxiliary block 75, controlling the fine adjustment therebetween.

The position control means for the back gage includes a storage member which is capable of storing the aforementioned impulse generating means, and in the preferred embodiment shown in FIGS. 1-5, the storage member is provided by a transparent or translucent band or tape 80, a portion of which is shown in FIG. 5. This tape is formed in a loop with its opposite ends fastened to the member 75, and passing around guide wheels 82 at opposite sides of the superstructure, as shown. These wheels are supported at the ends of crank arms 85 and 86 which are in turn pivotally mounted at their upper ends on stationary arms 87 and 88 respectively. Arm 85 is connected to the movable record rod 90 of a suitable linear acting motor 92 which is shown by way of example as a solenoid, but which might for example be provided as a pneumatic cylinder having a conventional servo control through a solenoid. In any event, the normal position of the storage member is defined by the normal position of the rod 90, with the solenoid deenergized, and the arms 85 and 86, together with tape 80, are biased to this position by a spring 95 connected at one end to arm 86, as through the extended rod 96, and fastened at its other end to any suitable stationary anchorage on the machine. An adjustable stop 98 is provided in the form of a stop screw mounted in the path of movement of arm 85, and thus adapted to provide an abutment against which this arm will engage when the solenoid 92 is energized, defining the shifted position of the storage member and its mountings.

The impulse generating markings on the tape are provided by placing an opaque mark thereon at a control position as the back gage is stopped in preselected position during at the set up operation. In turn, the control position is defined by a light source 100 on one side of the control member 80, with the light therefrom passing through the storage member and to a pickup head 105. This pickup head includes two light sensing devices in the form of a primary or stop photocell 106 and a secondary or a low-to-stop speed control photocell 107. When the back gage is advancing the corresponding upper flight or section of the tape 80 will be moving from left to right as viewed in FIG. 3, and thus the impulse generating marks on tape 80 will pass first between the light source 100 and photocell 107, generating a "slow" impulse, and the mark will subsequently reach the stop position defined by the photocell 106, intercepting the light thereto and generating a "stop" impulse.

Figure 6:
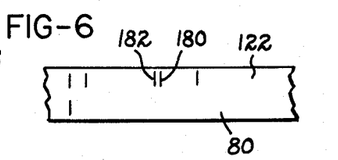
FIG. 6 is a view showing a portion of one type of control storage member provided in accordance with the invention.
Figure 7:
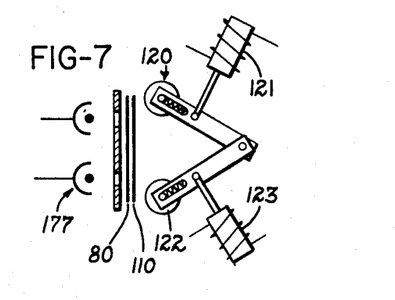
FIG. 7 is a diagrammatic view showing the relation of the pickup device with respect to a storage member such as shown in FIG. 6.

Provision is made for placing opaque markings on tape 80 by a carbon paper ribbon or the like 110 which passes along the tape 80 in the area of the pickup head 105, preferably on the opposite side of tape 80, guided by a pair of rollers 112. The ribbon 110 is supplied from a replaceable reel 115, and is taken up after use on a reel 116 which may be selectively power operated by a motor 118. Preferably the ribbon advanced after each marking such that essentially uniform density of marks is obtained by employing a fresh piece of ribbon for each mark. The mark is placed by means of a scriber 120 positioned behind the ribbon 110 and adapted upon actuation by the operator, through energizing of the control solenoid 121, to scribe across the back of the ribbon pressing it against the surface of tape 80, and leaving an erasable opaque mark thereon. A scriber 122 and associated control solenoid 123 is also provided for marking in a separate channel, as to provide marks indicating "end of job," to reverse the back gage motor, etc. A plurality of such marks in typical control channels 124, extending lengthwise of control member 80, are shown in FIG. 6.

As mentioned previously, the opaque markings on tape 80 are erasable, such that corrections can be made or an entire series of marks representing a particular cutting job can be eradicated and replaced by a new set of marks. A suitable erasing apparatus is shown in FIG. 5, embodying a cloth tape 125 which is supplied from a reel 126 and taken up on a reel 127 operated by motor 128. The tape passes along the surface of the control member 80 normally spaced somewhat therefrom, and about a controlling roller 130 which is mounted on one end of pivotally supported bell crank 132. The bell crank may be turned by means of a control solenoid 135 to engage a portion of the cloth tape 125 with the surface of control member 80, and in this position if the motor 128 is actuated the cloth tape will be wiped along the surface of control member 80 effectively eradicating the opaque markings thereon.

Figures 8, 9, 10, 11:
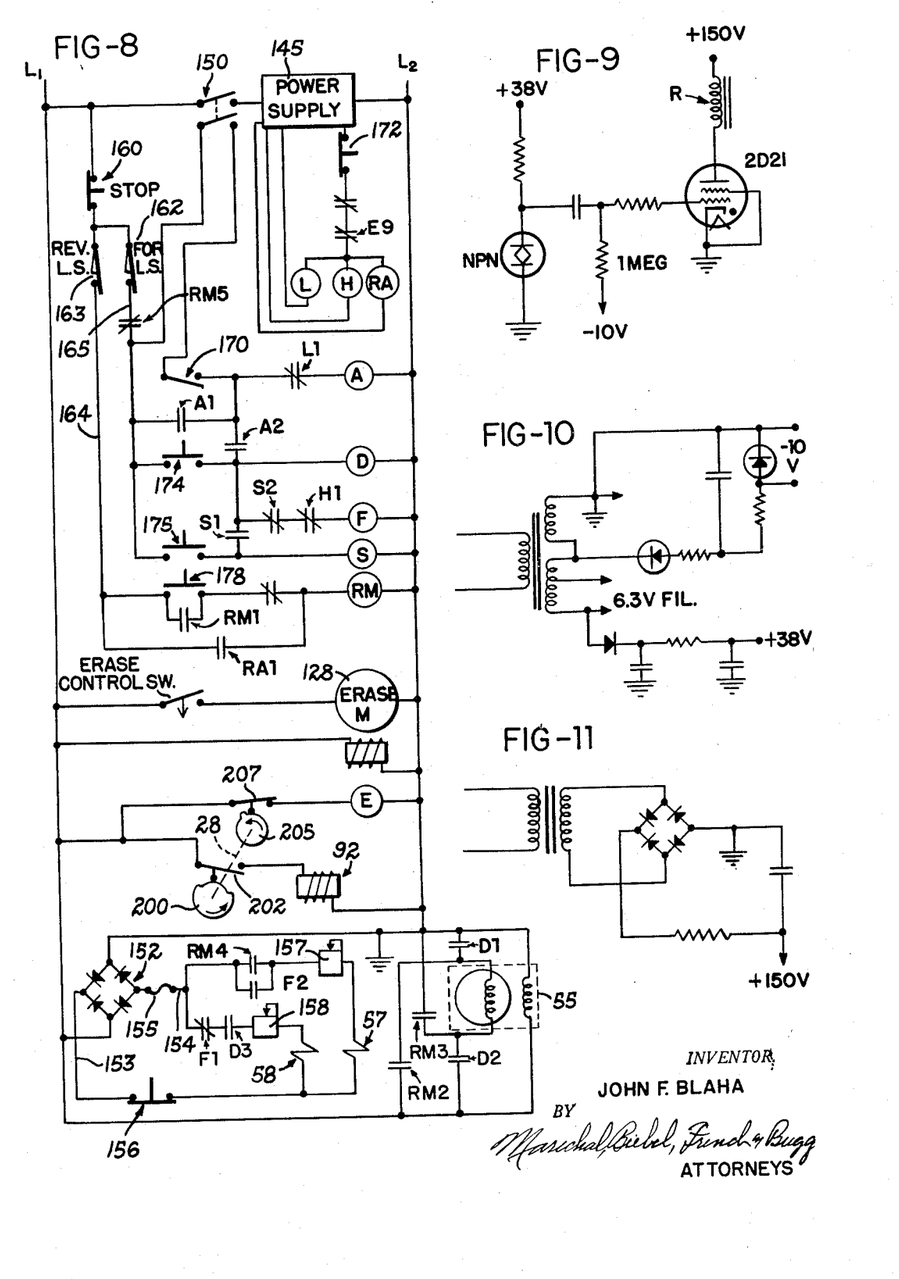
FIG. 8 is a wiring diagram for a control system as shown in FIGS. 1–5.
FIG. 9 is a schematic diagram of a suitable photo-control circuit which may be used in the system illustrated in FIG. 8.
FIGS. 10 and 11 are schematic diagrams of portions of a suitable power supply as shown in block form in FIG. 8.

FIGS. 7–10 show a typical control circuit which may be used in connection with the above described control system for a cutter back gage. FIG. 8 shows a typical electronic control actuated by a photo duodiode of the NPN type, which may be used for both of the impulse sensitive photocells 106 and 107 and also for the reverse control photocell 140. It will be understood that this circuit is duplicated for each of the three photocells, and that when an opaque mark passes between the light source and the photocell an impulse will result causing the control grid of the thyratron, for example type 2D21, to be momentarily positive with respect to ground, and the thyratron will fire energizing the relay coil R. The relay will remain energized until the thyratron is extinguished by breaking the circuit between the +150 v. power source and the thyratron.

FIG. 9 shows a typical power supply circuit which supplies the relatively low +38 v. source for the photocells and the 6.3 v. A.C. filament voltage. FIG. 11 shows a suitable circuit for supplying the +150 v. D.C. supply to the relay circuits controlled by the thyratrons as shown in FIG. 8. In FIG. 8 which illustrates the essential circuitry of the back gage control, the lines L1 and L2 indicate a suitable source of A.C. voltage, for example, 110 v., 60 cycle A.C., and the block unit 145 labeled "power supply" includes the circuitry shown in FIGS. 9 and 10. The input to the power supply unit is controlled by a manually operated DPST switch 150, and particularly the upper contacts thereof as shown.

Referring to the lower portion of FIG. 8, the full wave rectifier 152 supplies direct current to lines 152 and 154 through fuse 155, and this entire circuit is also under the control of a normally closed switch 156 which is operated by any suitable portion of the clamp actuating mechanism to open whenever the clamp is away from its raised, at rest, position. Line 154 connects separately to the previously described transmission control coils 57 and 58, and the current through each, to adjust their holding power, may be controlled by variable resistors 157 and 158, respectively. These circuits are also controlled by the contacts of several solenoids in the main circuit, as will presently be described.

For purposes of explanation it will be assumed that the stop switch 160 is in its normally closed or operative position, and that the back gage 10 is at some intermediate position in its range of movement such that the forward limit switch 162, which it will engage at its foremost position, closest to the knife, and the rear or reverse limit switch 163, which the back gage will open at its rearmost limit, will both be closed. Thus, the lines 164 and 165 will be connected to L1. When the operator wishes to use the automatic control for the back gage he closes switch 150, connecting the power supply unit 145 to the A.C. source. At the same time the lower contacts of switch 150 are closed, and when the operator closes the manually actuated autostart switch 170 this will supply power to the coil of the main control relay A. This closes the contacts A1 and A2 of relay A.

The relay L is normally connected to power supply unit 145, since the manual reset switch 172 is normally closed, and this relay is in turn controlled by the primary or low speed to stop photocell 106. This relay has a single set of normally closed contacts L1 which control the coil of the main relay A, and thus whenever an impulse is transmitted from the photocell 106 relay L is energized opening contacts L1 and dropping out the coil of relay A to open its contacts A1 and A2. The high to low relay H is connected to the power supply 145 in parallel with relay L, and its energization in turn is controlled by the high to low or secondary photocell 107, through the same type of circuit as shown in FIG. 8. Relay H has a single set of normally closed contacts H1 which are in a circuit controlling the coil of the fast speed relay F.

It should be understood that unless the relay F is energized the transmission 50 will automatically operate at slow speed. Therefore, when a fast to slow impulse from photocell 107 causes the relay H to be energized, relay F drops out and the transmission shifts to low speed. This function is provided by having normally closed contacts F1 in the circuit of the slow speed transmission coil 58 and normally open contacts F2 in the circuit of the high speed coil 57. Thus, when F is energized contacts F1 will open and F2 will close, and only coil 57 will be energized to move the back gage at high speed, assuming at this time that the back gage is moving forward. When H is energized, and thus F deenergized the situation will reverse with coil 58 connected in the D.C. circuit through contacts F1, while contacts F2 are then open and the high speed coil 57 receives no power. Assuming therefore that the back gage is moving forward, and that no impulse has as yet been transmitted by either of the control photocells, the relay A will be energized and relay F will be energized, and the back gage will move forward at high speed. It is also possible for the operator to advance the back gage at high speed, overriding the control, by closing the normally open fast switch 174 which bypasses the contacts A1 and A2 and energizes the relay F so long as the high to low speed relay H is deenergized. If the operator wishes to advance the back gage at slow speed he may close the normally open slow switch 175, and this in turn will energize the coil of relay S which closes its normally open holding contacts S1 and opens its normally closed contacts S2 in the circuit of relay F. The back gage will then advance at slow speed, with impulses from the stop photocell 107 having no effect, until an impulse from the stop photocell 106 energizes the relay L and drops the relay A out of the circuit, opening contacts A1 and A2.

When relay A is energized the coil of the forward relay D is energized through the contacts A, and A2, as it is also when the manually operated fast or slow switches 174 or 175 are closed. This closes the contacts D1 and D2 in the control for the back gage drive motor 55 to operate it in a direction driving the back gage forward. At the same time the contacts D3 are closed in the circuit of the transmission slow control coil 58. However, if the fast relay F is energized contacts F1 are opened and F2 are closed, as previously mentioned, so that the transmission operates in its high or fast speed range.

To operate the back gage in reverse two separate relays connected in parallel are provided. The first reversing relay RA is controlled by the photocell 177 (FIG. 7) through a circuit embodying a thyratron, substantially as shown in FIG. 9. This relay has contacts RA1 which when closed provide for energizing the coil of the main reversing relay RM. This relay includes holding contacts RM1 in its own energizing circuit as well as contacts RM2 and RM3 which when closed provide for operation of the back gage drive motor in reverse. A further set of contacts RM4 are provided in the control circuit of the fast coil 57 of the transmission, such that the back gage is driven at high speed when the motor operates in reverse. If it is desired to operate the back gage manually in reverse a normally open switch 178 may be closed by the operator bridging the RM1 holding contacts to energize the coil of the main reverse relay and lock it in through these contacts. The RM relay also includes normally closed contacts RM5 in the line 165 which open to cut off all power supply to the A, D, F and S relays, while the back gage operates in reverse. It will then proceed to its rear unit where the switch 163 will open, dropping the RM relay out of the circuit, and the back gage will again move forward at fast speed until the secondary photocell 107 first senses an impluse generating mark on the record member.

From the foregoing description it will be noted that the same opaque impluse generating mark on the record 80 is sensed twice by the pickup head 105, first by the photocell 107 to slow down the back gage and subsequently by the photocell 106 to stop the back gage in the precise predetermined position. In a typical embodiment of the invention the physical spacing between these photocells in the pickup head may be about three-fourths of an inch, and it is possible, especially in the case of trim cuts, to have a lesser spacing between marks on the record member. Therefore, in such circumstances it may be that when a stop mark 180 (FIG. 6) is aligned with the stop position defined by the photocell 106, the following mark 182 may fall between the photocells, and if the back gage control were to start in fast speed after the cut had been made, it is possible that the mark 182 would be either missed, or that the back gage would coast beyond the three selected positions after the impulse therefrom had stopped the back gage.

To prevent such an occurrence a pre-scan feature is incorporated in the control system which provides for a determination, after each cut is made, of the possible presence of a mark between the photocells. This feature is provided by the solenoid 92 which when energized will produce relative movement between the pickup head and the record member in the opposite direction from normal scanning, by moving the entire record member while the back gage is stationary, with the looped record tape 80 passing around the rollers 82 as they are moved. This is accomplished by means of a cam 200 which is rotated by the knife drive shaft 28, and operates to close a normally open switch 202 controlling energization of solenoid 92. When the knife goes through its cutting cycle, therefore, switch 202 is closed for part of this cycle and solenoid 92 is energized to move the record member 80 relative to the pickup head 105 a distance slightly less than the total spacing between the photocells 106 and 107. A further cam 205 is also rotated to open momentarily a switch 207 controlling the normally energized extinguishing relay E, which has contacts E1 in the power circuit of the relay coils LH and RA.

Thus, the thyratrons in the controls for these relays are extinguished just before the solenoid 92 is deenergized toward the end of the knife cutting cycle, to assure that these relays are deenergized and that the relay H is prepared to respond to transmission of a control impulse from the photocell 107 when the record member 80 is released and returned by the spring 95. On such return stroke if there was a mark (such as 182) between the photocells it will pass over photocell 107 energizing relay H, and the system will be set up to start the back gage at slow speed. The mark will then approach the primary photocell 106 at slow speed and will provide the proper precise arrestment of the back gage.

Figure 12:
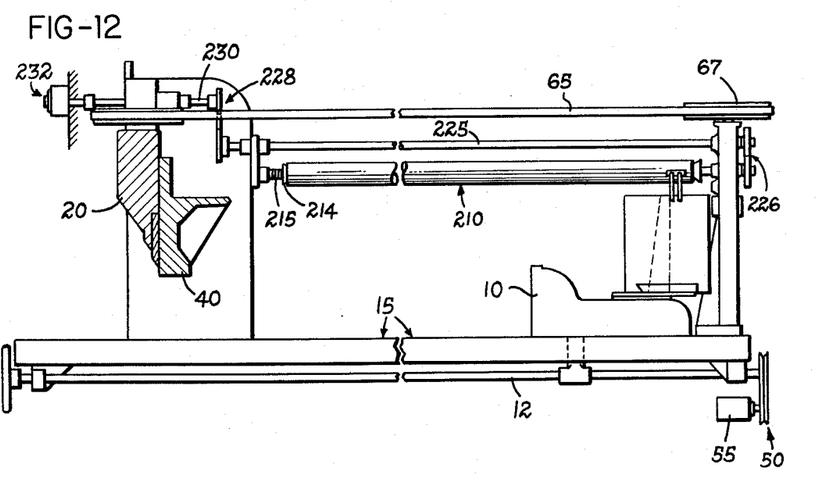
FIG. 12 shows a modified form of control arrangement.
Figure 13:
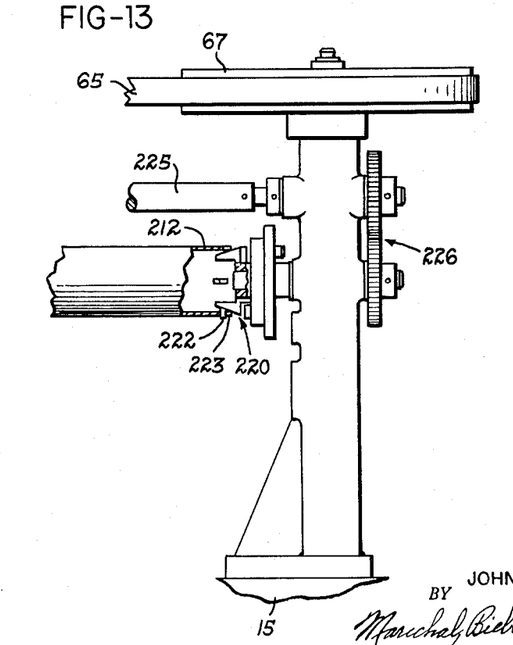
FIGS. 13, 14 and 15 are detail views of parts of such modified arrangement.
Figure 14:
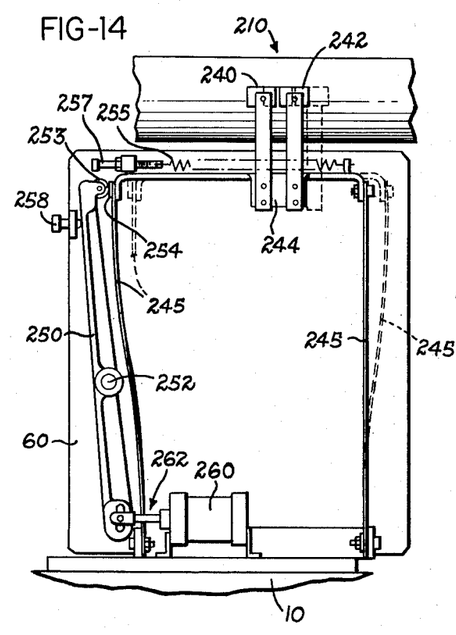
Figure 15:
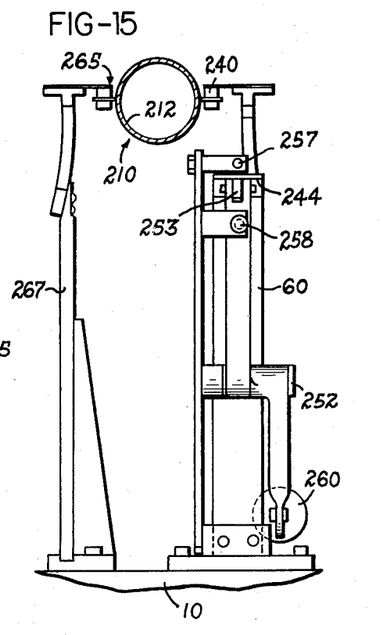

Referring to FIGS. 12, 14 and 15 wherein the same reference numerals are applied to parts identical to those shown in FIGS. 1 and 2, the back gage 10 includes an upwardly extending arm 60 of generally inverted U-shape, and which traverses a path above and with the back gage. Along this path there is mounted a control member 210 which preferably is in the form of a long magnetic tape wrapped about and fastened to a tubular member 212 (FIG. 14). Of course, any other suitable means for forming a selectively magnetizable surface on this tube may be employed. The tube 212 is replaceable, and thus is held in place at its forward end by a spring loaded jaw 214, under the bias of spring 215, and at its rearward end an indexing jaw 220 engages with the tube. This jaw includes at least one outwardly extending pin 222 which may be received in slot 223 in the edge of tube 212 to provide for precise concurrent movement of the jaw and the tube.

Figure 17:
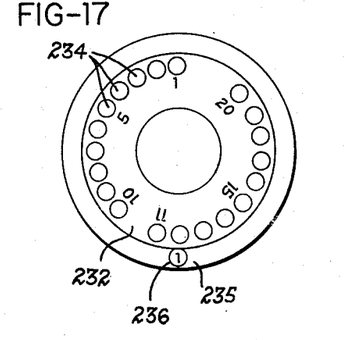
FIG. 17 is a diagram of a suitable channel selector.

The control tape 210 may be indexed by rotation of tube 212 about its longitudinal axis to bring successive different longitudinal strips on the surface of the tape into a reading position. This in effect provides separate operating channels and therefore the information for a number of different jobs may be recorded on the surface of the tape. For this purpose a countershaft 225 extends parallel to the tube 212 and is connected to rotate jaw 220 through a set of mating gears 226 (FIG. 12) and this shaft in turn is rotated by means of a sprocket and chain drive 228 from a control shaft 230 which is provided with a manually operable dial 232 at the front of the machine above the housing for the knife and clamp, and thus within easy reach of the operator. As shown particularly in FIG. 17, this dial may include a number of selector pins 234, shown as twenty in number, which may be depressed or otherwise displaced in any suitable fashion to engage with stop. Preferably, the dial is provided with a stationary mask 235 having a reading aperture 236, and numerals are inscribed on the dial opposite the pins to appear in the aperture 236 corresponding to the number of the channel in operative position.

Therefore, the position control means for the back gage includes the tape 210 which provides a storage member capable of storing impulse generating means, as in the form of magnetic impulses which are recorded on the surface thereof. These markings are erasable by conventional means for degaussing to eradicate the magnetic mark on the tape, and an entire series of such magnetic impulse generating means may be formed along channel, representing a particular cutting job and capable of locating back gage 10 accordingly at the positions required by such job.

The arm 60 in this construction provides a mounting for the fast-to-slow reading head 240 and the slow-to-stop reading head 242, which are mounted in alignment upon a carrying bracket 244 (FIG. 14). This bracket is supported from the arm 60 on a pair of leaf springs 245 which are anchored at their lower ends to the arm and thus carry the mounting bracket 244 for limited movement at the upper ends thereof, with the linkage acting as a type of parallelogram system to provide essentially linear movement of the sensing heads with respect to the control record member 210. This movement is provided by a lever 250 pivotally mounted at 252 on the arm 60, and having a roller 253 at its upper end which engages with a pad 254 formed on the bracket 244.

A spring 255 extends between a point on the bracket 244 and an adjustable stationary anchor member 257, which may preferably take the form of a threaded rod or the like as shown in FIG. 14. This spring urges the bracket toward the roller 253, and the limit of such movement is provided by an adjustable stop stud 258 which is also mounted on the arm 60.

At the lower end of lever 250 there is a connection with a pre-scan control solenoid 260 which has its movable armature member connected to the lever 250 as shown generally at 262. Thus, energizing of solenoid 260 will drive lever 250 to pivot in a clockwise direction, as viewed in FIG. 14, producing a pre-scanning relative movement between the sensing heads 240 and 242, and the record control member 210 over the range shown generally by the solid and dotted lines in FIG. 14.

On the opposite side of the control member 210 there is a reverse movement control sensing head 265 which is mounted on a fixed vertically extending arm 267, and is thus capable of sensing control pulses recorded on member 210 for the purpose of governing reversing and returning movement of the back gage control motor.

Figure 16:
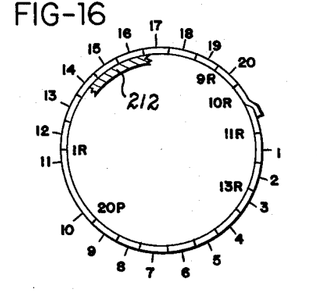
FIG. 16 is a diagram showing the distribution of control channels over the surface of a tubular form control tape as used in such modification.

A suitable arrangement of channels for control of the back gage is shown in FIG. 16, which is a schematic representation of a cross section through a control member 210. The numerals 1 through 20 indicate separate channels each of which may be aligned with the sensing heads 240 and 242 for precise control of forward or spacing movement of back gage 10. The channels marked by the same numerals followed by the suffix R represent corresponding channels to the main control channels which can carry control pulses to be sensed by the pickup head 265. Only some of the "R" channels have been enumerated on the drawing.

Essentially the same control system as shown in FIG. 8 can be employed for the apparatus shown in FIGS. 12–17, with the understanding that solenoid 260 would be substituted for solenoid 92, and that in place of the erasing control for eradicating magnetic recording to erase the marks or control pulses recorded on the member 210 if such is desired.

Figure 18:
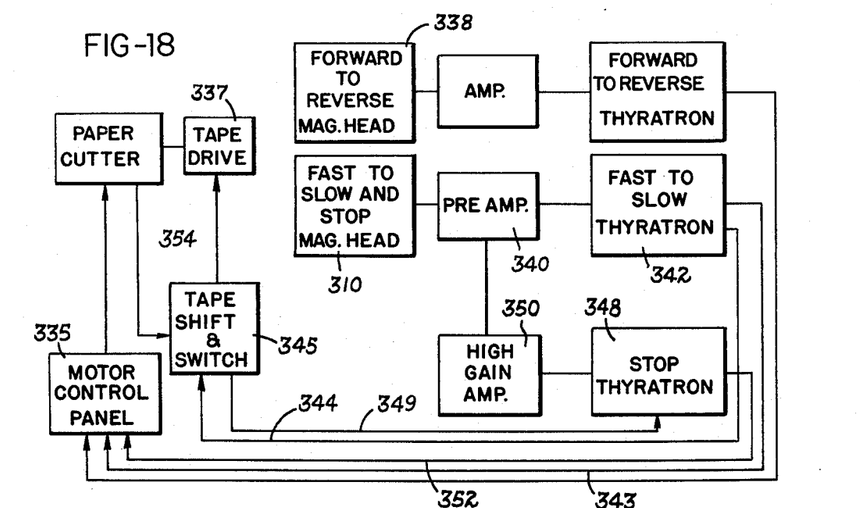
FIG. 18 is a block diagram of the control circuit which may be used with any of the modifications disclosed herein.
Figure 19:
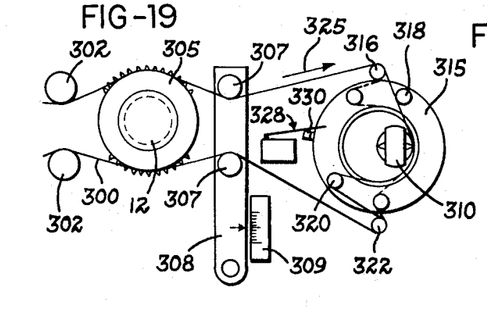
FIGS. 19 and 20 are somewhat diagrammatic views of further modifications of a control in accordance with the invention.
Figure 20:
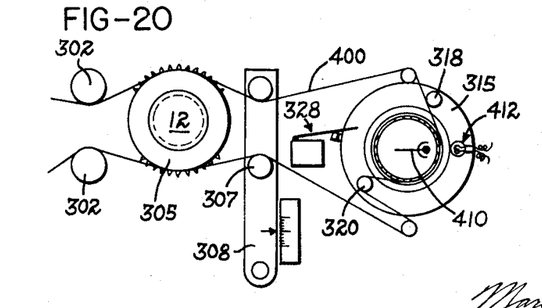

FIGS. 19 and 20 show, in somewhat schematic fashion, a modified form of apparatus which incorporates the features of the present invention. The two devices shown in these figures differ from each other essentially only in that the arrangement shown in FIG. 19 employs a magnetic recording tape control member and magnetic sensing head, whereas the arrangement in FIG. 20 employs an optical system (i.e., light beam and photo cell) sensing apparatus for sensing control pulses, and the pulses are recorded as visible marks on a tape. Thus, these two related modifications will be described together. The block diagram of a control system, shown in FIG. 18, is suitable for the apparatus shown in either of FIGS. 19 or 20.

Referring first to FIG. 19, the record control member is provided as a tape 300 capable of recording magnetic marks or pulses, and is received from a conventional reel and passed onto a further such reel, neither of these reels being shown for purposes of simplification. The tape is guided by rollers 302 into engagement with a drive sprocket 305, and this sprocket in turn is driven from the lead screw 12 which controls movement of the back gage. Therefore, since the tape is positively driven by sprocket 305, by reason of the toothed engagement thereof with the tape, the tape will pass around the sprocket at a speed which is directly related to movement of the back gage. It is preferable to have the tape move at a linear velocity somewhat faster than the linear movement of the back gage, in order to space out the controlling pulses on the tape somewhat and thus provide better sensing thereof, as between adjacent control pulses. This ratio of movement may be conveniently controlled by selecting an appropriate diameter for sprocket 305, and in one embodiment of the invention a suitable ratio was found to be of a factor of 6:1, in other words a tape speed of approximately six times the movement of the back gage.

The tape passes from sprocket 305 around guiding rollers 307 which are mounted upon a vernier control rod or bracket 308, and this bracket is provided with a reference mark which may be related to a corresponding stationary scale 309, mounted adjacent the rod or bracket 308. Thus, if it is necessary to provide a fine adjustment of a position of a control pulse generating upon the tape with respect to back gage position, movement of the rollers 307, by adjusting rod 308, will advance, or retract, a pulse generating means upon the tape with respect to the reading head 310, while avoiding movement of the tape with respect to sprocket 305.

The reading head 310 is mounted in a fixed position, adjacent to a tape control ring 315 which is in turn mounted for rotational movement about its central axis. A roller 316 guides the tape toward the ring 315, and the tape is threaded behind a first controlling roller 318 on this ring, thence across the reading head 310, and thence about a further control roller 320 also carried by ring 315. From the roller 320 the tape passes about a further guide roller 322 and from the roller 322 the tape continues on about the other roller 307 carried on the adjustment rod 308.

The rotary movement of the ring 315 may be accomplished by driving thereof through a suitable shifting solenoid (not shown), which may, for example, be conveniently of the type shown at 260 in connection with FIG. 14 and the previously described embodiment. The throw of the solenoid may be regulated, and the respective shifted positions of ring 315 also regulated, by suitable stops, which have not been shown in order to simplify the diagrammatic illustration. The placement of such stops will be obvious to those skilled in the art.

The apparatus as shown in full lines in FIG. 19 is in position for normal high speed advancement of the back gage, and as the back gage advances the sprocket 305 will rotate in a clockwise direction, feeding the tape in the direction of arrow 325. When the first pulse mark on the tape passes the head 310, this will result in a controlling impulse being transmitted to the drive motor control, to shift from high to low speed thereof, and at the same time, the ring 315 will be shifted to move the rollers 318 and 320 from the full line to the dotted line positions shown in FIG. 19. This will pull the segment of the tape in the area adjacent to reading head 310 backward with respect to the reading head, and therefore the same controlling pulse on the tape will again approach the reading head for the second time. The same pulse is again sensed by the reading head to produce the slow-to-stop signal which will stop the back gage in the precise position desired.

Adjacent to the ring 315 is a switch 328 which has its operating arm extended to be engaged by a lug 330 on the ring. This switch is normally held open by engagement with the lug when the ring is in its normal position, shown in full lines, but when the ring is shifted the lug moves away from the switch and it will close (as by operation of an internal spring therein) to provide a signal to the control system that the next pulse sensed by the head 310 is for the purpose of stopping the back gage.

FIG. 18 shows a block diagram of a suitable control system for this arrangement, and also for the arrangement shown in FIG. 20 as will presently be described. The paper cutter is shown as a block which includes of course the back gage, and the motor control panel 335 is the type of control such as shown at the bottom of the diagram in FIG. 8, in other words a control governing starting, stopping, reversing, and high or low speed operation of the back gage drive motor. The tape drive 337 is operated from the back gage drive, as previously explained, and the tape 300 will advance over the reading head 310 as the back gage is moved. In addition to this reading head, there is another stationary reading head (shown schematically at 338) of the same type which is effective to control the reverse movement of the back gage, in the same manner as the head 265 previously described.

Assuming that the tape is moving forward, and the back gage thus advancing, the reading head 310 will sense the first controlling magnetic mark or pulse upon the tape and will cause an impulse to be transmitted through the preamplifier 340 to the fast to slow control 342, which may be of the type shown in FIG. 9. This control will in turn transmit a pulse through line 343 to the motor control panel 335, causing the back gage drive to shift from fast to slow speed. Simultaneously, the control 342 will transmit an impulse through line 344 to the tape shift control 345 which will cause the ring 315 to be rotated moving the rollers 318 and 320 to the dotted line positions and thus carrying the control mark which has been sensed back to a position in advance of the reading head 310. When the fast to slow control 342 is energized, switch 328 will close, and this will also set up the stop control 348 through a gating connection 349 which may be used, for example, to apply a positive voltage to a grid of the thyratron such as shown in the control circuitry in FIG. 9. This same circuit can be used for the stop control 348, with the exception that a thyratron having a third control grid may be used in conventional fashion to form the gating circuit which will prevent operation of the stop thyratron until the gating circuit 349 is energized.

When the same or previously sensed pulse mark passes again over the reading head 310 a further impulse will pass through the high gain amplifier 350, which is desirable since the tape is now moving at a slower speed, and the resultant pulse from the amplifier will be directed to the stop control 348 to fire its thyratron and direct a controlling pulse through line 352 to the motor control panel, resulting in stopping of the back gage.

With the back gage thus positioned properly, the operator will initiate a cutting cycle, and at the completion of the cutting cycle a signal will be directed through line 354 to the tape shift control 345 and cause the ring 315 to be returned to its initial position, i.e., the fast to slow scanning position. During such reverse relative movement between the reading head 310 and the tape, the tape will be advanced over the reading head, the previously sensed pulse generating mark which caused stopping of the back gage will be carried beyond the reading head, and if there is a "trim-out" pulse generating mark closely following the first pulse mark, for example by a distance less than the length of tape scanned when the ring 315 is moved, then such trim-out mark will immediately cause an impulse to be passed through the pickup or reading head and preamplifier 340 to actuate the fast-to-slow thyratron control. The back gage will then start forward in slow sped and the ring will be immediately shifted back (to the dotted line position), and when this trim-out pulse reaches the head 310 it will actuate the stop control 348 to halt the back gage in the precise position desired for such trim out.

With respect to the modified control shown in FIG. 20, the entire operation of this arrangement is the same as previously described in connection with FIG. 19, and accordingly like parts are designated by the same reference numerals. The only differences are that the tape 400 is of the optical reading type, preferably a transparent or transluscent tape with erasable opaque markings thereon, and the magnetic reading head 310 is replaced by a photocell 410 and a light source for energizing the photocell, shown diagrammatically at 412. Operation of this arrangement is the same as previously described, and the same control as shown in FIG. 18 may be used therewith.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. A control for positioning a movable member having substantial inertia in a plurality of predetermined infinitely variable positions, comprising position control means extending along a defined path and including a plurality of pulse generating means spaced thereon to define successive desired positions of said member, dual speed drive means connected to move said member and selectively operable at relatively high or low speeds, pulse sensing means for scanning said position control means, means mounting said pulse sensing means to scan said position control means and sense individual control pulses therefrom, means connected to produce relative scanning movement between said position control means and said pulse sensing means in correlated relation to movement of said movable member, means for causing limited relative movement between said control means and said pulse sensing means independently of motion of said member and between predetermined limits defining high-to-low and low-to-stop reference positions of said pulse sensing means, control means receiving control pulses from said pulse sensing means and operatively connected to said dual speed drive means for causing a shift thereof from high-to-low speed in response to the first sensing of a pulse from said control means and for again sensing the same pulse in the low-to-stop position for transmitting a stop signal to said drive means, and means for actuating said limited movement causing means before starting said drive means to determine the speed at which said drive means is started.

2. A control for positioning a movable member having substantial inertia in a plurality of predetermined infinitely variable positions, comprising drive means for said member including a two speed control operative to move said back gage at relatively high and low speeds, a position control means capable of storing impulse generating means in spaced relation defining a succession of desired positions of said member, an impulse sensitive pickup head including a primary impulse sensitive device for controlling stopping of said drive means and a secondary sensing device mounted to precede said primary device in scanning said position control means to control the shifting of said drive means from high to low speed, means producing relative scanning movement between said pickup head and said position control means in accordance with motion of said member, means for producing opposite relative scanning movement between said position control means and said pickup head independent of motion of said member over a distance at least equal to the spacing between said primary and secondary sensing devices, and a control means operative prior to starting motion of said member to produce such opposite relative movement for sensing impulse generating means between said devices and operative to start said drive means in low speed after the knife has completed its cut in response to an impulse generating means sensed during such independent relative movement.

3. A control for positioning a movable member having substantial inertia in a plurality of predetermined infinitely variable positions, comprising position control means including a plurality of pulse generating means spaced thereon to define successive desired positions of said member, dual speed drive means connected to move said member and selectively operable at relatively high and low speeds, a single pulse sensing means for scanning said position control means, means mounting said pulse sensing means to scan said position control means and sense individual control pulses therefrom, means operative to provide relative scanning movement between said position control means and said pulse sensing means in correlated relation to movement of said member and a corresponding high and low speeds, means for causing opposite relative movement between said member and said pulse sensing means through a distance greater than the minimum spacing between adjacent pulse generating means, and control means receiving control pulses from said pulse sensing means and operatively connected to said dual speed drive means for causing a shift thereof from high-to-low speed in response to the first sensing of a pulse on said control means and concurrently to energize said opposite movement producing means for again sensing the same pulse in the low-to-stop position for transmitting a stop signal to said drive means.

4. A control for positioning a movable member having substantial inertia in a plurality of predetermined infinitely variable positions, comprising an elongated position control means including a plurality of pulse generating means spaced thereon to define successive desired positions of said member, dual speed drive means connected to move said member and selectively operable at relatively high and low speeds, pulse sensing means for scanning said position control means, means mounting said pulse sensing means to scan said position control means and sense individual control pulses therefrom, means operative to provide relative scanning movement between said position control means and said pulse sensing means in correlated relation to movement of said member, means for causing independent opposite relative movement between said control means and said pulse sensing means between predetermined limits defining high-to-low and low-to-stop reference positions of said pulse sensing means, and control means receiving control pulses from said pulse sensing means and operatively connected to said dual speed drive means for causing a shift thereof from high-to-low speed in response to the first sensing of a pulse from said control means and concurrently to energize said independent movement producing means for subsequent sensing of the same pulse in the low-to-stop position to transmit a stop signal to said drive means.

5. In combination with a cutting machine having a work table, a knife mounted for movement toward and away from said table to cut material thereon, a knife drive operative to move said knife through a cutting cycle, a back gage movable along said table to position material to be cut, a dual speed drive means for said back gage operative to drive said gage at a higher speed during relatively long traverse movements and at a lower speed when approaching an exact predetermined position for said gage, a position control means including a control storage member capable of storing an impulse generating means in preselected spaced relation representing successive desired positions of said gage, a pickup head for sensing impulses from said storage member, means causing relative scanning movement between said head and said storage member in relation to movement of said back gage and between cutting cycles of said knife, control means receiving control impulses from said head and connected to operate said dual speed drive means controlling transition from high-to-low speed as said gage approaches a selected position and controlling stopping of said gage precisely at the selected position, and means operative to pre-scan a portion of said storage member while said gage is stationary for predetermining the speed at which said dual speed drive means should operate initially to advance said gage.

6. In combination with a cutting machine having a work table, a knife mounted for reciprocating movement in a cutting plane with reference to said table, a back gage movable along said table toward and away from said cutting plane for positioning material to be cut, drive means for said back gage including a two speed control operative to move said back gage at relatively high and low speeds, an elongated position control member capable of storing impulse generating means in spaced relation defining a succession of desired positions of said back gage, an impulse sensitive pickup head including a primary impulse sensitive device for controlling stopping of said drive means and a secondary sensing device mounted to precede said primary device in scanning said position control means to control the shifting of said drive means from high to low speed, means for producing opposite relative movement between said member and said pickup head over a distance at least equal to the spacing between said primary and secondary sensing devices, and control means operative during a cutting operation of said knife to produce such opposite relative movement for sensing impulse generating means between said devices and operative to start said drive means in low speed after the knife has completed its cut in response to an impulse generating means sensed during such opposite relative movement.

7. In combination with a cutting machine including a work table, a knife mounted for reciprocating movement in a cutting plane with reference to said table, a back gage movable along said table toward and away from said cutting plane for positioning material to be cut, drive means for said back gage including a two speed control operative to move said back gage at relative high and low speeds, an elongated member capable of storing impulse generating means in spaced relation along its length to define a succession of desired positions of said back gage, an impulse sensitive pickup head, means operative to produce relative movement between said member and said pickup head in predetermined relation with movement of said back gage, means for producing opposite relative movement between said member and said pickup head over a predetermined range, and control means responsive to an impulse from said pickup head operative to shift said speed control from high-to-low and concurrently to energize said opposite movement producing means for again sensing the same impulse to produce a stop signal.

8. In combination with a cutting machine having a work table, a knife mounted for movement toward and away from said table to cut material thereon, a knife drive operative to move said knife through a cutting cycle, a back gage movable along said table to position material to be cut, a dual speed drive means for said back gage operative to drive said gage at a higher speed during relatively long traverse movements and at a lower speed when approaching an exact predetermined position for said gage, a position control means including a control storage member capable of storing an impulse generating means in pre-selected spaced relation representing successive desired positions of said gage, a pickup head for sensing impulses from said storage member, means causing relative scanning movement between said head and said storage member in relation to movement of said back gage and between successive movements of said back gage, control means receiving control impulses from said head and connected to operate said dual speed drive means controlling transition from high to low speed as said gage approaches a selected position and controlling stopping of said gage precisely at the selected position, and means operative during each cutting cycle of said knife to cause independent pre-scanning relative movement between a portion of said storage member and said pickup head while said gage is stationary for determining the speed at which said dual speed drive means should operate to move said gage after the knife cutting cycle.

9. In combination with a cutting machine having a work table, a knife mounted for movement toward and away from said table to cut material thereon, a knife drive operative to move said knife through a cutting cycle, a back gage movable along said table to position material to be cut, a dual speed drive means for said back gage operative to drive said gage at a higher speed during relatively long traverse movements and at a lower speed when approaching an exact predetermined position for said gage, a position control means including a storage member capable of storing an impulse generating means in pre-selected spaced relation representing successive desired positions of said gage, a pickup head for sensing impulses from said storage member, means causing relative scanning movement between said head and said storage member in relation to movement of said back gage and between cutting cycles of said knife, control means receiving control impulses from said head and connected to operate said dual speed drive means controlling transition from high to low speed as said gage approaches a selected position and stopping of said gage precisely at the selected position, means operative during a cutting cycle of said knife to pre-scan a portion of said storage member while said gage is stationary for determining the speed at which said dual speed drive means should operate to advance said gage after the knife cutting cycle, said pickup head having a pair of impulse sensitive devices including a primary device connected to control stopping of said back gage drive means and a secondary sensing device mounted to precede said primary device in scanning said storage member to control the change in speed of said back gage, means for producing opposite scanning movement between said storage member and said pickup head over a distance at least equal to the spacing between said primary and secondary sensing devices, and control means operative during a knife cutting cycle to produce such opposite scanning movement for sensing possible presence of an impulse generating means between said devices while said back gage is stationary and thus to determine at which speed said dual speed back gage drive means operates after the knife cutting cycle.

10. In combination with a cutting machine having a work table, a knife mounted for movement toward and away from said table to cut material thereon, a knife drive operative to move said knife through a cutting cycle, a back gage movable along said table to position material to be cut, a dual speed drive means for said back gage operative to drive said gage at a higher speed during relatively long traverse movements and at a lower speed when approaching an exact predetermined position for said gage, a position control means including a storage member capable of storing an impulse generating means in pre-selected spaced relation representing successive desired positions of said gage, a pickup head for sensing impulses from said storage member, means causing relative scanning movement between said head and said storage member in relation to movement of said back gage and between cutting cycles of said knife, control means receiving control impulses from said head and connected to operate said dual speed drive means controlling transition from high-to-low speed as said gage approaches a selected position and stopping of said gage precisely at the selected position, means operative during a cutting cycle of said knife to pre-scan a portion of said storage member while said gage is stationary for determining the speed at which said dual speed drive means should operate to advance said gage after the knife cutting cycle, said pickup head having a single impulse sensitive device, means for changing the relative position of said storage member and said pickup head between normal and shifted positions independently of back gage movement and in response to the first sensing of an impulse by said device, said device in its shifted position being operative to respond to the same impulse for transmitting a stop signal to said control means, and means for causing reverse relative movement between said storage member and said device during a knife cutting cycle to determine possible presence of an impulse generating means between said normal and shifted positions of said device for determining the speed at which said dual speed drive means should operate to advance said gage after the knife cutting cycle.

References Cited in the file of this patent

UNITED STATES PATENTS

| | | |
|---|---|---|
| 2,860,705 | Thumin | Nov. 18, 1958 |
| 2,916,801 | Lyttle | Dec. 15, 1959 |
| 2,976,372 | Sampson | Mar. 21, 1960 |
| 2,992,578 | Hribar | July 18, 1961 |

FOREIGN PATENTS

| | | |
|---|---|---|
| 1,009,271 | Germany | May 29, 1957 |

UNITED STATES PATENT OFFICE
CERTIFICATE OF CORRECTION

Patent No. 3,118,334            January 21, 1964

John F. Blaha

It is hereby certified that error appears in the above numbered patent requiring correction and that the said Letters Patent should read as corrected below.

In the grant, lines 1 to 3, for "John F. Blaha, of Cleveland, Ohio," read -- John F. Blaha, of Cleveland, Ohio, assignor to Harris-Intertype Corporation, of Cleveland, Ohio, a corporation of Delaware, --; line 12, for "John F. Blaha, his heirs" read -- Harris-Intertype Corporation, its successors --; in the heading to the printed specification, lines 5 and 6, for "John F. Blaha, % Harris-Intertype Corp., 55 Public Square, Cleveland 13, Ohio" read -- John F. Blaha, Cleveland, Ohio, assignor to Harris-Intertype Corporation, Cleveland, Ohio, a corporation of Delaware --; column 4, line 32, strike out "at"; line 54, after "ribbon" insert -- is --; column 9, line 57, after "generating" insert -- means --; column 16, line 20, for "Thumin" read -- Thumim --.

Signed and sealed this 16th day of June 1964.

(SEAL)
Attest:

ERNEST W. SWIDER            EDWARD J. BRENNER
Attesting Officer            Commissioner of Patents